US012763327B2

(12) United States Patent
Fu et al.

(10) Patent No.: US 12,763,327 B2
(45) Date of Patent: Oct. 13, 2026

(54) POSITIVE ELECTRODE ACTIVE MATERIAL AND POSITIVE ELECTRODE PLATE FOR ALL-SOLID-STATE LITHIUM SECONDARY BATTERY, ALL-SOLID-STATE LITHIUM SECONDARY BATTERY, AND APPARATUS

(71) Applicant: JIANGSU CONTEMPORARY AMPEREX TECHNOLOGY LIMITED, Changzhou (CN)

(72) Inventors: Jiawei Fu, Changzhou (CN); Chengyong Liu, Changzhou (CN); Bobing Hu, Changzhou (CN); Qian Li, Changzhou (CN); Meng Cheng, Changzhou (CN); Yongsheng Guo, Changzhou (CN)

(73) Assignee: JIANGSU CONTEMPORARY AMPEREX TECHNOLOGY LIMITE, Changzhou (CN)

( * ) Notice: Subject to any disclaimer, the term of this patent is extended or adjusted under 35 U.S.C. 154(b) by 483 days.

(21) Appl. No.: 18/053,749

(22) Filed: Nov. 8, 2022

(65) Prior Publication Data

US 2023/0075778 A1 Mar. 9, 2023

Related U.S. Application Data

(63) Continuation of application No. PCT/CN2021/080522, filed on Mar. 12, 2021.

(30) Foreign Application Priority Data

May 9, 2020 (CN) ........................ 202010384073.0

(51) Int. Cl.

*H01M 4/525* (2010.01)
*H01M 4/04* (2006.01)
(Continued)

(52) U.S. Cl.

CPC ......... *H01M 4/525* (2013.01); *H01M 4/0404* (2013.01); *H01M 4/485* (2013.01);
(Continued)

(58) Field of Classification Search

CPC ........... H01M 10/052; H01M 10/0525; H01M 10/0562; H01M 10/0585; H01M 4/36;
(Continued)

(56) References Cited

U.S. PATENT DOCUMENTS

2010/0112456 A1* 5/2010 Kimura et al. ... H01M 10/0525 429/304
2013/0059209 A1 3/2013 Ota et al.
(Continued)

FOREIGN PATENT DOCUMENTS

CN 101657918 A 2/2010
CN 102842713 A 12/2012
(Continued)

OTHER PUBLICATIONS

ESPACENET translation of KR102047256B1 (Year: 2019).*
(Continued)

*Primary Examiner* — Mark Ruthkosky
(74) *Attorney, Agent, or Firm* — K&L Gates LLP

(57) ABSTRACT

The present disclosure relates to a positive electrode active material and a positive electrode plate for all-solid-state lithium secondary battery, an all-solid-state lithium secondary battery, and an apparatus. The positive electrode active material provided in the present disclosure includes a positive electrode active substance and a sodium thiosulfate coating layer coating a surface of the positive electrode active substance. Applying the positive electrode active material provided in the present disclosure to the positive electrode plate for all-solid-state lithium secondary battery
(Continued)

can significantly improve the cycling performance and capacity retention rate of the battery.

20 Claims, 3 Drawing Sheets

(51) Int. Cl.

| | |
|---|---|
| ***H01M 4/485*** | (2010.01) |
| ***H01M 4/505*** | (2010.01) |
| ***H01M 10/052*** | (2010.01) |
| ***H01M 10/0562*** | (2010.01) |
| *H01M 4/02* | (2006.01) |

(52) U.S. Cl.
CPC ......... *H01M 4/505* (2013.01); *H01M 10/052* (2013.01); *H01M 10/0562* (2013.01); *H01M 2004/028* (2013.01); *H01M 2300/0068* (2013.01)

(58) Field of Classification Search
CPC ...... H01M 4/0404; H01M 4/13; H01M 4/131; H01M 4/136; H01M 4/1391; H01M 4/366; H01M 4/485; H01M 4/505; H01M 4/525; H01M 4/5815; H01M 4/5825; H01M 4/62; H01M 4/628; H01M 50/103; H01M 50/209; H01M 2004/021; H01M 2004/028; H01M 2220/20; H01M 2300/0068
See application file for complete search history.

(56) References Cited

U.S. PATENT DOCUMENTS

| | | | |
|---|---|---|---|
| 2020/0144612 | A1 | 5/2020 | Kim et al. |
| 2020/0194788 | A1 | 6/2020 | Mitsumoto et al. |
| 2021/0408532 | A1 | 12/2021 | Kim et al. |

FOREIGN PATENT DOCUMENTS

| | | | |
|---|---|---|---|
| CN | 102893431 | A | 1/2013 |
| CN | 109585810 | A | 4/2019 |
| CN | 110190327 | A | 8/2019 |
| CN | 110383543 | A | 10/2019 |
| CN | 111033828 | A | 4/2020 |
| CN | 111293313 | A | 6/2020 |
| CN | 112420977 | A | 2/2021 |
| KR | 102047256 | B1 | 11/2019 |

OTHER PUBLICATIONS

Sodium Thiosulphate amorphous_VEDANTU_Website (Year: 2019).*
Liu Yang et al: "Heating-temperature-dependent electrochemical-performance-enhanced surface structural evolution during chemical treatment of Li-rich layered material by sodium thiosulfate", Journal of Power Sources, Elsevier, Amsterdam, NL, vol. 455, Mar. 4, 2020 (Mar. 4, 2020), XP086102205, ISSN: 0378-7753, DOI:10.1016/J.JPOWSOUR.2020.227795 [retrieved on Mar. 4, 2020].
The extended European search report received in the European Application No. 21803650.7, mailed Jan. 2, 2023, 8 pages.
International Search Report and Written Opinion received in PCT Application PCT/CN2021/080522 on Jun. 2, 2021.
The first Office Action received in the corresponding Chinese Application 202010384073.0.
The second Office Action received in the corresponding Chinese Application 202010384073.0.
The third Office Action received in the corresponding Chinese Application 202010384073.0.
The Notice of Allowance received in the corresponding Chinese Application 202010384073.0.
Tetsutaro Hayashi et al., "Effect of lithium-iondiffusibility oninterfacialresistance ofLiCoO2 thin filmelectrode modifiedwith lithiumtungsten oxides", published Nov. 29, 2015 on "Journal of Power Sources" p. 46-53.

* cited by examiner

POSITIVE ELECTRODE ACTIVE MATERIAL AND POSITIVE ELECTRODE PLATE FOR ALL-SOLID-STATE LITHIUM SECONDARY BATTERY, ALL-SOLID-STATE LITHIUM SECONDARY BATTERY, AND APPARATUS

CROSS-REFERENCE TO RELATED APPLICATIONS

The present disclosure is a continuation of International Application PCT/CN2021/080522, filed on Mar. 12, 2021, which claims priority to Chinese Patent Application No. 202010384073.0, filed on May 9, 2020 and entitled "POSITIVE ELECTRODE ACTIVE MATERIAL AND POSITIVE ELECTRODE PLATE FOR ALL-SOLID-STATE LITHIUM SECONDARY BATTERY, ALL-SOLID-STATE LITHIUM SECONDARY BATTERY, AND APPARATUS", which are incorporated herein by reference in their entireties.

TECHNICAL FIELD

Embodiments relate to the field of batteries, and specifically, to a positive electrode active material and a positive electrode plate for all-solid-state lithium secondary battery, an all-solid-state lithium secondary battery, and an apparatus.

BACKGROUND

With development and maturity of science and technology, lithium batteries are being applied more widely. Cycling performance is an important indicator for measuring quality of a lithium battery. In the same condition, quality of a battery is poorer if battery capacity declines faster. In some examples, longer cycle life means smaller resource consumption from a macro perspective.

To improve performance of batteries, a series of positive electrode active materials with high electrochemical activity are developed in the technical field of lithium batteries. However, the high electrochemical activity of the positive electrode active materials easily causes a series of side reactions on contact interfaces between electrodes and an electrolyte, resulting in gradual loss of battery capacity along charging and discharging of the battery, that is, degradation of battery cycling performance. Especially in an all-solid-state lithium secondary battery, electrodes are in solid-phase contact with an electrolyte, which is not as good as solid-liquid contact in a liquid battery. Therefore, the all-solid-state lithium secondary battery has a higher requirement for electrochemical activity of positive electrode materials, which easily causes degradation of battery cycling performance.

SUMMARY

In view of the problem in the background, the present disclosure provides a positive electrode active material for all-solid-state lithium secondary battery.

According to a first aspect, the present disclosure provides a positive electrode active material for all-solid-state lithium secondary battery, including a positive electrode active substance and a sodium thiosulfate coating layer coating a surface of the positive electrode active substance.

The sodium thiosulfate coating layer isolates a substance causing side reactions from the positive electrode active substance, alleviating degradation of a positive electrode plate caused by the side reactions on contact interfaces between electrodes and an electrolyte, and improving the cycling performance and capacity retention rate of the battery.

According to a second aspect, the present disclosure provides a positive electrode plate for all-solid-state lithium secondary battery, including a positive electrode current collector and a positive electrode active substance layer disposed on at least one surface of the positive electrode current collector, where the positive electrode active substance layer includes a solid-state electrolyte and the positive electrode active material according to the first aspect of the present disclosure.

Because sulfur atoms on a surface of the positive electrode active material are easy to attract sulfur atoms in the solid-state electrolyte, when a mass ratio of element sulfur on the surface of the positive electrode active material to element sulfur in the solid-state electrolyte ranges from 0.06:1 to 0.28:1, constraints on lithium ions in the solid-state electrolyte can be effectively reduced, improving ion conductivity performance on interfaces between the active material in the positive electrode plate and solid-state electrolyte particles, and increasing a capacity retention rate of a solid-state battery during cycling.

According to a third aspect, the present disclosure provides an all-solid-state lithium secondary battery, including a positive electrode plate, a negative electrode plate, and a solid-state electrolyte membrane disposed between the positive electrode plate and the negative electrode plate, where the positive electrode plate is the positive electrode plate according to the second aspect of the present disclosure.

The all-solid-state lithium secondary battery may be used as a power source of an apparatus or an energy storage unit of an apparatus.

According to a fourth aspect, the present disclosure provides an apparatus, including the all-solid-state lithium secondary battery according to the third aspect of the present disclosure, where the all-solid-state lithium secondary battery is used as a power source of the apparatus or an energy storage unit of the apparatus.

A secondary battery (Cell), a battery module (Module), or a battery pack (Pack) may be selected for the apparatus according to requirements for using the apparatus.

Compared with the prior art, the present disclosure has at least the following advantages:

In a lithium secondary battery, high electrochemical activity of a positive electrode active material easily causes side reactions on contact interfaces between electrodes and an electrolyte, resulting in degradation of battery cycling performance. In an all-solid-state lithium secondary battery, electrodes are in solid-phase contact with an electrolyte, which is not as good as solid-liquid contact in a liquid battery. Therefore, the all-solid-state lithium secondary battery has a higher requirement for electrochemical activity of positive electrode materials, which easily causes degradation of battery cycling performance.

The positive electrode active material for all-solid-state lithium secondary battery provided in the present disclosure forms a physical sodium thiosulfate coating layer on a surface of a positive electrode active substance. The coating layer effectively isolates a substance causing the side reactions from the positive electrode active substance, thereby alleviating degradation of a positive electrode plate caused by side reactions occurring on a contact interface between the positive electrode plate and the electrolyte. Applying the positive electrode active material provided in the present disclosure to the positive electrode plate for all-solid-state lithium secondary battery can significantly improve the cycling performance and capacity retention rate of the battery.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF EMBODIMENTS

The present disclosure is further described with reference to specific embodiments. It should be understood that these specific embodiments are merely intended to illustrate the present disclosure but not to limit the scope of the present disclosure.

Reference signs are described as follows:

1. battery pack;

2. upper box body;

3. lower box body;

4. battery module; and

5. all-solid-state lithium secondary battery.

Positive Electrode Active Material

A first aspect of the present disclosure relates to a positive electrode active material for all-solid-state lithium secondary battery, including a positive electrode active substance and a sodium thiosulfate coating layer coating a surface of the positive electrode active substance. The sodium thiosulfate coating layer isolates a substance causing side reactions from the positive electrode active substance, alleviating degradation of a positive electrode plate caused by the side reactions on contact interfaces between electrodes and an electrolyte, and improving the cycling performance and capacity retention rate of the battery.

Figure 1:
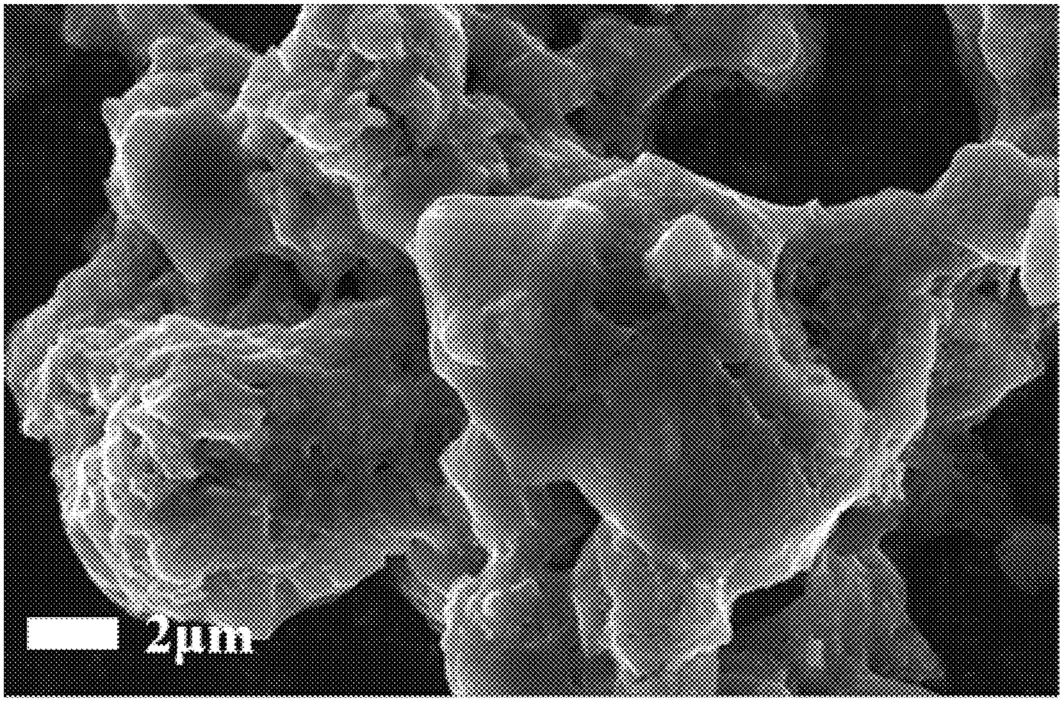
FIG. 1 is a scanning electron microscope graph of a positive electrode active material according to an embodiment of the present disclosure.

In an embodiment, the sodium thiosulfate coating layer physically coats the surface of the positive electrode active substance. Such physical coating on the surface is formed not by a simple mixture of sodium thiosulfate and the positive electrode active substance, or by the sodium thiosulfate in the coating layer entering the positive electrode active substance, but by the sodium thiosulfate uniformly coating the surface of the positive electrode active substance. Therefore, in this embodiment of the present disclosure, the sodium thiosulfate coating layer has no impact on electronic conductivity and rate performance of the positive electrode active substance. In some embodiments, the sodium thiosulfate coating layer is a continuous amorphous membrane layer on the surface of the positive electrode active substance. A possible reason is that: If the sodium thiosulfate coating layer is a crystal long-range ordered structure, even if there is an electric field, it is difficult for lithium ions to be intercalated into or deintercalated from a surface of the positive electrode material over a long distance, such that a battery is severely polarized and may not be normally charged or discharged. In this specification, the surface is coated through ball milling. Therefore, fast temperature drop after the ball milling causes the sodium thiosulfate to form no long-range ordered structure, and only form crystallites in a small zone, with massive amorphous structures of crystalline boundaries. In this way, anisotropy between different zones cancels each other out, so that overall isotropy is achieved and an apparent dielectric constant is lowered, thereby enhancing the electric field to help deintercalation of the lithium ions. In addition, a short-range ordered structure does not hinder conduction of lithium ions. Therefore, an amorphous structure is an effective means to overcome the shortcomings. In addition, in some embodiments, the continuous coating layer is used, to prevent uncoated zones from impairing a barrier effect on the side reactions. FIG. 1 is a scanning electron microscope graph of a positive electrode active material according to an embodiment of the present disclosure. As can be seen from FIG. 1, there is a coating layer on a surface of a positive electrode active substance, and the coating layer is formed by coagulation after liquefied sodium thiosulfate uniformly coats the surface of the positive electrode active substance.

In the present disclosure, X-ray diffraction analysis is performed on samples, to determine whether a sodium thiosulfate coating layer is amorphous. If there is a sharp peak of the sodium thiosulfate ($2\theta=19.906°$, $21.729°$, or $29.271°$), it indicates that the sodium thiosulfate is in a crystalline state; if no such peaks exist, it indicates that the sodium thiosulfate is in an amorphous state.

It should be noted that, in this embodiment, the sodium thiosulfate is used to coat the surface of the positive electrode active substance, which can significantly improve the cycling performance and capacity retention rate of the battery, but may also have some adverse effects on the first-cycle specific capacity and first-cycle coulombic efficiency. However, because first-cycle charging and discharging of a battery usually occurs in the battery factory test process, the first-cycle specific capacity and first-cycle coulombic efficiency do not affect the use by users. In addition, national standards require that the electric vehicle battery has a capacity retention rate of more than 80% after 8 years or 120,000 kilometers of usage under normal operating conditions. Therefore, for the users, it is more important to improve the cycling performance and capacity retention rate of the battery.

In some embodiments, a coating rate of the sodium thiosulfate coating layer on the surface of the positive electrode active substance is not less than 95%. In some embodiments, a coating rate of the sodium thiosulfate coating layer on the surface of the positive electrode active substance is not less than 98%. Therefore, the cycling performance and capacity retention rate of the battery can be significantly improved without affecting the first-cycle specific capacity and first-cycle coulombic efficiency of the battery.

In this embodiment, the coating rate of the sodium thiosulfate coating layer on the surface of the positive electrode active substance means a percentage of an area of the sodium thiosulfate coating layer to a surface area of the positive electrode active substance. The coating rate may be determined by selecting several positive electrode particles under a scanning electron microscopy (SEM) and using an energy dispersive spectrum analysis (EDS) method to test element sulfur distribution on their surfaces. Because the positive electrode active substance has no sulfur and only the sodium thiosulfate has sulfur, the coating rate on the surface can be calculated by measuring an area of zones with sulfur on the surfaces of the positive electrode particles and the total surface area.

In some embodiments, a mass percentage of the sodium thiosulfate coating layer in the positive electrode active material is 1% to 30%, and optionally, 3% to 10% in some embodiments, so as to better improve the cycling performance and capacity retention rate of the battery. If a mass percentage of the sodium thiosulfate in the positive electrode active material is less than 1%, an amount of sodium thiosulfate is not enough to well coat the surface of the positive electrode active substance, and the cycling performance and capacity retention rate of the battery are not obviously improved. If a mass percentage of the sodium thiosulfate in the positive electrode active material is higher than 30%, a coating amount is too large, which causes the positive electrode active substance unable to contact electrons and lithium ions, easily leading to charge and discharge failure due to excessive polarization.

In this embodiment, the sodium thiosulfate ($Na_2S_2O_3$) coating the surface of the positive electrode active substance, with a molecular formula of $Na_2S_2O_3$, is a common thiosulfate.

Various embodiments do not impose special limitations on a specific type of the positive electrode active substance, as long as the positive electrode active substance can accept and release lithium ions. For example, the positive electrode active substance may be selected from at least one of lithium metal oxides with an olivine structure, lithium metal oxides with a layered structure, lithium metal oxides with a spinel structure, or modified materials of the foregoing materials. In this embodiment of the present disclosure, the sodium thiosulfate is used to coat surfaces of different positive electrode active substances, obviously reducing capacity decline during charging and discharging of the battery.

In this embodiment, the positive electrode active substance may be selected from at least one of $LiFe_{x1}Mn_{y1}M_{z1}PO_4$, $Li_3V_2(PO_4)_3$, $Li_3V_3(PO_4)_3$, $LiVPO_4F$, $LiNi_{0.5-x2}Mn_{1.5-y2}M'_{x2+y2}O_4$, or $Li_{1+x3}Ni_{1-y3-z3}Co_{y3}M''_{z3}O_2$;

where 0≤x1≤1, 0≤y1≤1, 0≤z1≤1, and x1+y1+z1=1, and M does not exist or M is selected from at least one of Al, Mg, Ga, Ti, Cr, Cu, Zn, or Mo;

−0.1≤x2≤0.5, and 0≤y2≤1.5, and M' does not exist or M' is selected from at least one of Mn, Co, Fe, Al, Mg, Ca, Ti, Mo, Cr, Cu, or Zn; and −0.1≤x3≤0.2, 0≤y3≤1, 0≤z3≤1, and 0≤y3+z3≤1, and M" does not exist or M" is selected from at least one of Mn, Fe, Al, Mg, Ga, Ti, Cr, Cu, Zn, or Mo.

In this embodiment, the positive electrode active substance may be selected from at least one of $LiFePO_4$, $LiMnPO_4$, $LiNiPO_4$, $LiCoPO_4$, $Li_3V_3(PO_4)_3$, $LiMn_2O_4$, $LiNi_{0.5}Mn_{1.5}O_4$, $LiCoO_2$, $LiNiO_2$, $LiCo_{1/3}Ni_{1/3}Mn_{1/3}O_2$, $LiNi_{0.8}Co_{0.1}Al_{0.1}O_2$, or $LiNi_{0.8}Co_{0.1}Mn_{0.1}O_2$.

In some embodiments, the positive electrode active substance is $Li_{1+x3}Ni_{1-y3-z3}Co_{y3}M''_{z3}O_2$, where −0.1≤x3≤0.2, 0≤y3≤1, 0≤z3≤1, and 0.05≤y3+z3≤0.4, and M" is selected from at least one of Mn, Al, Mg, or Ti. In some embodiments of the present disclosure, the lithium nickel cobalt manganese metal oxide with high nickel content is selected as the positive electrode active substance. After being coated with the sodium thiosulfate, stability of the surfaces of the positive electrode active substance particles is effectively improved. In some embodiments, high first-cycle energy density, high first-cycle coulombic efficiency, and good cycling performance of the battery can be achieved at the same time.

In this embodiment, when the positive electrode active substance is $Li_{1+x3}Ni_{1-y3-z3}Co_{y3}M''_{z3}O_2$ (−0.1≤x3≤0.2, 0≤y3≤1, 0≤z3≤1, and 0.05≤y3+z3≤0.4, and M" is selected from at least one of Mn, Al, Mg, or Ti), a volume-based median particle size $D_v50$ of the positive electrode active substance is 3 microns (μm) to 20 μm.

In the embodiments of the present disclosure, the volume-based median particle size $D_v50$ of the positive electrode active substance means that particles accounting for 50% of a total volume have a size larger than this value, and the other particles accounting for 50% of the total volume have a size less than this value. The volume-based median particle size $D_v50$ may be measured by using related methods in national standard GB/T 19077-2016.

In this embodiment, when the positive electrode active substance is $Li_{1+x3}Ni_{1-y3-z3}Co_{y3}M''_{z3}O_2$ (−0.1≤x3≤0.2, 0≤y3≤1, 0≤z3≤1, and 0.05≤y3+z3≤0.4, and M" is selected from at least one of Mn, Al, Mg, or Ti), a volume-based median particle size $D_v50$ of the positive electrode active substance is 4 μm to 18 μm. In the present disclosure, when a lithium nickel cobalt manganese metal oxide with high nickel content and with a volume-based median particle size $D_v50$ within the foregoing range is selected as the positive electrode active substance, the positive electrode active substance particles are not easy to disperse, and have a small specific surface area, which can effectively control occurrence of side reactions and ensure that electrons and ions of the positive electrode active material have small transmission resistance.

An embodiment also provides a method for preparing the positive electrode active material, including: in a dry atmosphere, mixing a positive electrode active substance with sodium thiosulfate, putting the mixture into a ball mill for ball milling, and drying the mixture to obtain a positive electrode active material.

A melting point of the sodium thiosulfate is 48 degrees Celsius (° C.). This embodiment of the present disclosure takes advantage of the characteristics that the sodium thiosulfate has a low melting point and can liquefy at a low temperature. The positive electrode active substance is mixed with the sodium thiosulfate, and a mixture is subject to ball milling. Heat generated during the ball milling liquefies the sodium thiosulfate, and the sodium thiosulfate in a liquid form uniformly coats the surface of the positive electrode active substance. After the ball milling finishes, the sodium thiosulfate in the liquid form solidifies again, so as to form a stable and uniform coating layer on the surface of the positive electrode active substance. The method for preparing a positive electrode active material provided in this embodiment of the present disclosure is easy to operate and suitable for industrial production.

In this embodiment, a raw material of the sodium thiosulfate for preparing the positive electrode active material may be sodium thiosulfate anhydrous, sodium thiosulfate pentahydrate, or a mixture of the sodium thiosulfate anhydrous and the sodium thiosulfate pentahydrate in any ratio. The sodium thiosulfate pentahydrate is a hydrate of the sodium thiosulfate. Because this embodiment of the present disclosure has a drying step during preparation of the positive electrode active material, the sodium thiosulfate anhydrous, the sodium thiosulfate pentahydrate, or a mixture thereof can be selected as the raw material to coat the positive electrode active substance.

In this embodiment, the ball milling means putting materials into a ball mill for crushing and mixture. The present disclosure does not impose special limitations on a type of the ball milling, which may be, for example, planetary ball milling, vibration ball milling, or stirring ball milling according to different types of the ball mill. A ball milling medium is selected from one or more of zirconium oxide, aluminum oxide, and silicon carbide, and a ratio of the ball mill to the material is 50:1 to 5:1. In some embodiments, a revolution speed ranges from 450 revolutions per minute (rpm) to 1200 rpm according to power of the ball mill. If the planetary ball milling is used, the specific process may be: putting the materials into a $ZrO_2$ ball mill tank of 45 milliliter (mL) (the ratio of the ball mill to the materials is 30:1), and performing planetary ball milling for 1 h at the revolution speed of 500 rpm. If the vibration ball milling is used, the specific process may be: putting the materials into a $ZrO_2$ ball mill tank of 45 mL (the ratio of the ball mill to the materials is 30:1), setting a vibration frequency to 20 hertz (Hz), and performing the ball milling for 1 hour (h). If the stirring ball milling is used, the specific process may be: putting the materials and a ball milling ball (the ratio of the ball mill to the materials is 30:1) into a grinding cylinder, setting a stirring speed to 300 rpm, and stirring for 1 h to manufacture the product.

In this embodiment, in some examples, the step of mixing the positive electrode active substance with the sodium thiosulfate is performed in a dry atmosphere. This is because the sodium thiosulfate has good affinity with water, and easily absorbs moisture in the air. However, the moisture has adverse effects on stability of electrolyte composition in a positive electrode, which may cause electrolyte decomposition or failure and affect cycling performance. Specifically, in some embodiments, the positive electrode active substance is mixed with the sodium thiosulfate in a dry atmosphere with moisture content lower than 0.10%.

In this embodiment, the step of drying the materials is performed after the ball milling. Because a high temperature needs to be used to dry under a non-vacuum condition, and the high temperature may cause the sodium thiosulfate to liquefy again, in some embodiments, vacuum drying is used. Specifically, the ball-milled materials are put under a negative pressure to lower a boiling point of the water, and the boiling point of the water under the negative pressure is reached by heating, so as to evaporate moisture in the materials and dry the materials. In addition, to prevent the sodium thiosulfate from liquefying, a longer drying time is required in a medium or low temperature. Therefore, in some embodiments of the present disclosure, a vacuum drying temperature may be 40° C. to 47° C.

Positive Electrode Plate

A second aspect relates to a positive electrode plate for all-solid-state lithium secondary battery, including a positive electrode current collector and a positive electrode active substance layer disposed on at least one surface of the positive electrode current collector, where the positive electrode active substance layer includes a solid-state electrolyte and the positive electrode active material according to the first aspect of the present disclosure.

In an embodiment, a type of the positive electrode current collector is not specifically limited, and may be selected according to actual needs. The positive electrode current collector may typically be layered, and the positive electrode current collector is typically a structure or component that can collect current. The positive electrode current collector may be various materials suitable to be used as the positive electrode current collector for an electrochemical energy storage apparatus in the art. For example, the positive electrode current collector may include but is not limited to a metal foil, and more specifically, may include but is not limited to a nickel foil or an aluminum foil. In some examples, the positive electrode active substance layer may be provided on one surface of the positive electrode current collector or on two surfaces of the positive electrode current collector.

In this embodiment, a type of the solid-state electrolyte is not specifically limited, and may be selected according to actual needs as long as the solid-state electrolyte helps transmission of lithium ions in the positive electrode active substance layer. For example, the solid-state electrolyte may be a sulfide solid-state electrolyte. The sulfide solid-state electrolyte may include lithium and sulfur, and in some embodiments, may further include other elements, for example, may include but is not limited to at least one of P, Si, Ge, Sn, Al, and other elements.

In this embodiment, a general formula of the sulfide solid-state electrolyte may be described as $yLi_2S$-(100-y) LS, where $0<y<100$, LS may be but is not limited to one or more of $P_2S_5$, $SiS_2$, $GeS_2$, $SnS_2$, $Al_2S_3$, and other substances, and a solid-state electrolyte system formed by the sulfide solid-state electrolyte may include but is not limited to one or more of a $Li_2S$—$P_2S_5$ system, a $Li_2S$—$SiS_2$ system, a $Li_2S$—$GeS_2$ system, a $Li_2S$—$SnS_2$ system, and a $Li_2S$—$Al_2S_3$ system. The sulfide solid-state electrolyte may be in a crystal state, an amorphous state, or a crystal-amorphous compound state.

In some embodiments, the sulfide solid-state electrolyte may further include a doping material, and the doping material may be a lithium-containing compound LiQ. Specifically, a general formula of the doped sulfide electrolyte may be described as $z(Li_2S\text{-}LS)\text{-}(100\text{-}z)$ LiQ, where $90 \le z \le 100$, and the doping material LiQ may include but is not limited to one or more of lithium halide, lithium oxide, lithium nitride, and lithium oxacid salt. LiQ may include but is not limited to one or more of LiF, LiCl, LiBr, LiI, $Li_2O$, $Li_3N$, $LiAlO_2$, $Li_3PO_4$, $Li_2SO_4$, $Li_3BO_3$, $Li_4SiO_4$, $LiN(SO_2F)_2$, $LiN(SO_2R_F)_2$, and $LiN(SO_2F)(SO_2R_F)$ (substituent group $R_F=CnF_{2n+1}$, which is saturated perfluoroalkyl, where n is an integer of 1 or 2).

In this embodiment, the sulfide solid-state electrolyte may be one or more of $Li_6PS_5Cl$, $Li_3PS_4$, and $Li_7P_3S_{11}$.

In this embodiment, in the positive electrode plate, a mass ratio of element sulfur on a surface of the positive electrode active material to element sulfur in the solid-state electrolyte ranges from 0.06:1 to 0.28:1. In the present disclosure, because sulfur atoms on the surface of the positive electrode active material easily attract sulfur atoms in the solid-state electrolyte, when the mass ratio of element sulfur on the surface of the positive electrode active material to element sulfur in the solid-state electrolyte is in the foregoing range, constraints on lithium ions in the solid-state electrolyte can be effectively reduced, improving ion conductivity performance on interfaces between the active material in the positive electrode plate and solid-state electrolyte particles, and increasing a capacity retention rate of a solid-state battery during cycling.

In this embodiment, in the positive electrode plate, a mass ratio of the positive electrode active material to the solid-state electrolyte may range from 60:40 to 85:15. In some embodiments, the mass ratio of the positive electrode active material to the solid-state electrolyte ranges from 70:30 to 80:20.

In this embodiment, the positive electrode active substance layer may further include a conductive agent and a binder, where a type and content of the conductive agent and the binder are not specifically limited, which may be selected according to actual needs. Specifically, the binder may be selected from at least one of SBS, SEBS, PVDF, PTFE, PAALi, styrene-butadiene rubber, nitrile rubber, butene rubber, styrene rubber, and polyurethane; and the conductive agent may be selected from at least one of conductive carbon black (Super-P), acetylene black, vapor-grown carbon fiber (VGCF), carbon nanotube, and graphene.

Those skilled in the art may select a suitable method for preparing the positive electrode plate according to the second aspect of the present disclosure. For example, the following steps may be included: mixing the positive electrode active material, the solid-state electrolyte, the binder, and the conductive agent in a ratio to form a solid mixed material, or disperse the same in an organic solvent to form a liquid slurry, and applying the liquid slurry on at least one surface of the positive electrode current collector for hot pressing, so as to obtain the positive electrode plate.

All-Solid-State Lithium Secondary Battery

A third aspect of the present disclosure relates to an all-solid-state lithium secondary battery, including a positive electrode plate, a negative electrode plate, and a solid-state electrolyte membrane disposed between the positive electrode plate and the negative electrode plate, where the positive electrode plate is the positive electrode plate according to the second aspect of the present disclosure.

In an embodiment, the negative electrode plate may be a negative electrode plate made of a lithium metal sheet and alloy thereof. In some embodiments, the negative electrode plate may be a lithium metal sheet. The negative electrode plate is directly made of the lithium metal sheet, which can increase working voltage of an all-solid-state lithium battery, thereby enhancing energy density.

In this embodiment, a type of the solid-state electrolyte membrane is not specifically limited, which may be selected according to actual needs. For example, the solid-state electrolyte membrane may alternatively be a sulfide solid-state electrolyte. In some examples, the type of the solid-state electrolyte membrane may be the same as a solid-state electrolyte in the positive electrode plate.

Figure 2:
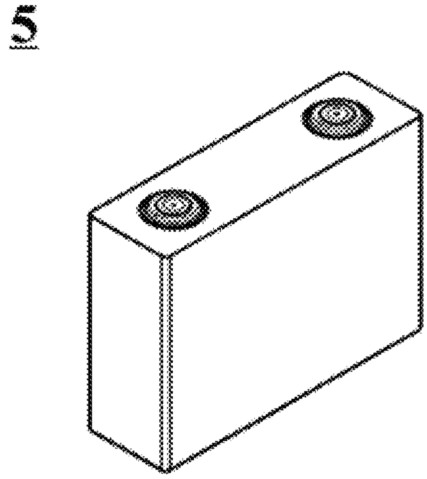
FIG. 2 is a schematic diagram of an embodiment of an all-solid-state lithium secondary battery according to the present disclosure.

The present disclosure does not impose special limitations on the shape of the all-solid-state lithium secondary battery, and the all-solid-state lithium secondary battery may be cylindrical, rectangular, or of any other shapes. FIG. 2 shows a rectangular all-solid-state lithium secondary battery 5 as an example.

In some embodiments, all-solid-state lithium secondary batteries may be assembled into a battery module, and the battery module may include a plurality of all-solid-state lithium secondary batteries. A specific quantity may be adjusted based on application and capacity of the battery module.

Figure 3:
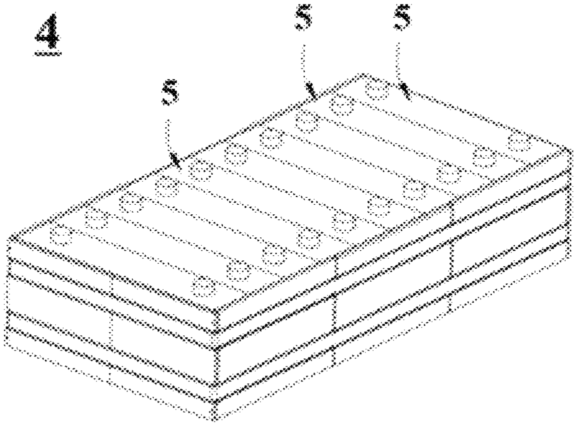
FIG. 3 is a schematic diagram of an embodiment of a battery module according to the present disclosure.

FIG. 3 shows a battery module 4 as an example. Referring to FIG. 3, in the battery module 4, a plurality of all-solid-state lithium secondary batteries 5 may be sequentially arranged in a length direction of the battery module 4. Certainly, the all-solid-state lithium secondary batteries may alternatively be arranged in any other manner. In some embodiments, the plurality of all-solid-state lithium secondary batteries 5 may be fastened by using fasteners.

In some embodiments, the battery module 4 may further include a housing with an accommodating space, and the plurality of all-solid-state lithium secondary batteries 5 are accommodated in the accommodating space.

In some embodiments, the battery modules may be further assembled into a battery pack, and a quantity of battery modules included in the battery pack may be adjusted based on application and capacity of the battery pack.

Figure 4:
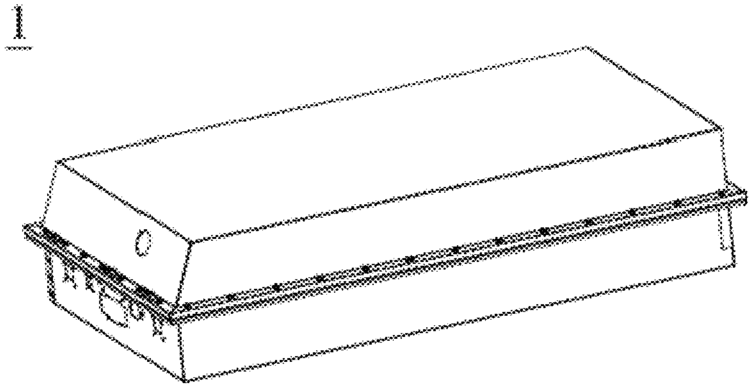
FIG. 4 is a schematic diagram of an embodiment of a battery pack according to the present disclosure.
Figure 5:
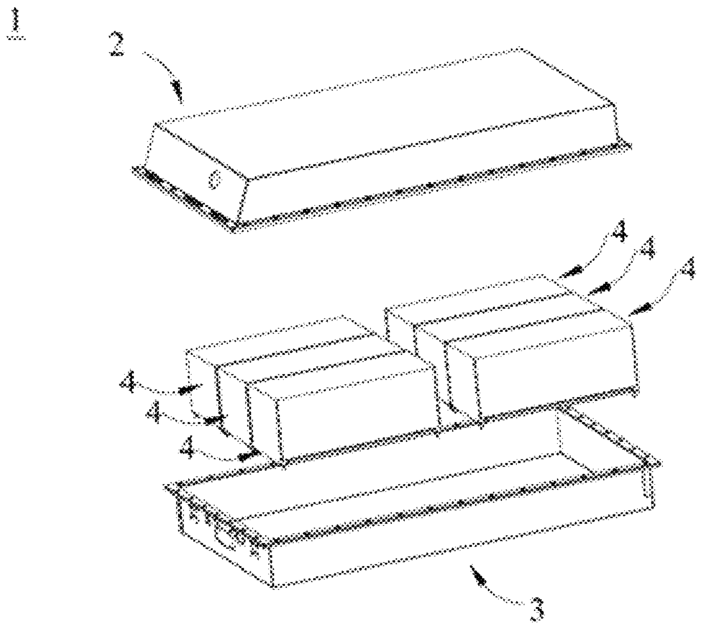
FIG. 5 is an exploded view of FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

Apparatus

A fourth aspect relates to an apparatus, and the apparatus includes the all-solid-state lithium secondary battery according to the third aspect of the present disclosure, where the all-solid-state lithium secondary battery is used as a power source of the apparatus or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery (Cell), a battery module (Module), or a battery pack (Pack) may be selected for the apparatus according to requirements for using the apparatus.

Figure 6:
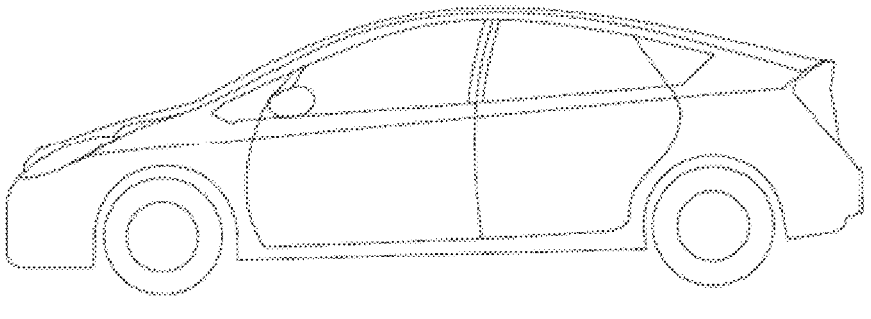
FIG. 6 is a schematic diagram of an embodiment of an apparatus using an all-solid-state lithium secondary battery as a power source according to the present disclosure.

FIG. 6 shows an apparatus as an example. The apparatus is a battery electric vehicle, a hybrid electric vehicle, a plug-in hybrid electric vehicle, or the like. To meet requirements of the apparatus for high power and high energy density of the secondary battery, a battery pack or a battery module may be used.

In another example, the apparatus may be a mobile phone, a tablet computer, a notebook computer, or the like. The apparatus is usually required to be light and thin, and the secondary battery may be used as a power source.

Those skilled in the art may understand that the foregoing definitions or optional ranges of component selection, component content, and material physicochemical performance parameters in electrochemical active materials in different embodiments of the present disclosure may be randomly combined, and various embodiments obtained through the combination shall still fall within the scope of the present disclosure and shall be considered as a part of content disclosed in this specification.

Unless otherwise specified, various parameters in this specification have general meanings well known in the art, and may be measured by using a method well known in the art. For example, a test may be conducted in a method provided in an example of the present disclosure. In some examples, optional ranges and options of different parameters provided in various optional examples may be randomly combined, and it is considered that various combinations obtained shall fall within the disclosed scope of the present disclosure.

The following further describes advantages of the present disclosure with reference to specific examples. It should be understood that these examples are merely used to describe the present disclosure but not to limit the scope of the present disclosure.

Examples 1 to 15 and Comparative Examples 1 to 5

1. Preparation of Positive Electrode Active Material

In a dry argon atmosphere, a raw material of a positive electrode active substance and a raw material of sodium thiosulfate were mixed in a specific mass ratio, and then the mixture was ball-milled and dried to obtain a positive electrode active material.

2. Preparation of Positive Electrode Plate

In a glove box, the prepared positive electrode active material and a solid-state electrolyte $Li_6PS_5Cl$ were fully stirred and uniformly mixed at a mass ratio of 70:30 and dispersed on a surface of aluminum foil, and then the mixture was pressed for 2 minutes (min) at 100° C. and 250 megapascal (MPa) to obtain a positive electrode plate with a thickness of 50 μm.

3. Preparation of all-Solid-State Lithium Secondary Battery

In a glove box, a sulfide solid-state electrolyte $Li_6PS_5Cl$ was pressed for 2 minutes at 100° C. and 250 MPa to obtain a solid-state electrolyte membrane with a thickness of 50 μm; and a lithium metal sheet of 25 μm was used as a negative electrode plate. The prepared positive electrode plate, solid-state electrolyte membrane, and negative electrode plate were stacked in sequence with their centers aligned, and subject to cold pressing for 2 minutes at room temperature and 250 MPa to obtain a battery cell unit. 10 battery cell units were cold pressed and packaged in an outer package to obtain an all-solid-state lithium secondary battery.

Comparative Example 6

1. Preparation of Positive Electrode Active Material

A raw material of a positive electrode active substance and a raw material of sodium thiosulfate were mixed in a specific mass ratio, and then the mixture was ground by a mortar for 10 minutes under at a liquid nitrogen temperature to obtain a positive electrode active material. In this comparative example, the sodium thiosulfate and the positive electrode active substance were mixed and ground at the liquid nitrogen temperature without a process of liquefaction and then solidification of the sodium thiosulfate.

2. Preparations of a positive electrode plate and an all-solid-state lithium secondary battery were the same as those in Examples 1 to 15 and Comparative Examples 1 to 5.

Specific parameters of the positive electrode active materials in Examples 1 to 15 and Comparative Examples 1 to 6 are shown in Table 1.

TABLE 1

| | Positive electrode active substance | | | Sodium thiosulfate | | | | |
|---|---|---|---|---|---|---|---|---|
| | Type | Mass proportion | Median particle size $D_v50$ (μm) | Type | Mass proportion | Ball milling process | Coating rate | State of coating layer |
| Example 1 | $LiNi_{0.8}Co_{0.1}Mn_{0.1}O_2$ | 70 | 12 | Sodium thiosulfate anhydrous | 30 | Planetary ball milling | 99% | Amorphous, continuous |
| Example 2 | $LiNi_{0.8}Co_{0.1}Mn_{0.1}O_2$ | 80 | 12 | Sodium thiosulfate anhydrous | 20 | Planetary ball milling | 98% | Amorphous, continuous |
| Example 3 | $LiNi_{0.8}Co_{0.1}Mn_{0.1}O_2$ | 90 | 12 | Sodium thiosulfate anhydrous | 10 | Planetary ball milling | 98% | Amorphous, continuous |
| Example 4 | $LiNi_{0.8}Co_{0.1}Mn_{0.1}O_2$ | 95 | 12 | Sodium thiosulfate anhydrous | 5 | Planetary ball milling | 98% | Amorphous, continuous |
| Example 5 | $LiNi_{0.8}Co_{0.1}Mn_{0.1}O_2$ | 97 | 12 | Sodium thiosulfate anhydrous | 3 | Planetary ball milling | 95% | Amorphous, continuous |
| Example 6 | $LiNi_{0.8}Co_{0.1}Mn_{0.1}O_2$ | 99 | 12 | Sodium thiosulfate anhydrous | 1 | Planetary ball milling | 93% | Amorphous, continuous |
| Example 7 | $LiNi_{0.8}Co_{0.1}Mn_{0.1}O_2$ | 95 | 12 | Sodium thiosulfate anhydrous | 5 | Vibration ball milling | 98% | Amorphous, continuous |
| Example 8 | $LiNi_{0.8}Co_{0.1}Mn_{0.1}O_2$ | 95 | 12 | Sodium thiosulfate pentahydrate | 5 | Planetary ball milling | 98% | Amorphous, continuous |
| Example 9 | $LiCoO_2$ | 95 | 20 | Sodium thiosulfate anhydrous | 5 | Planetary ball milling | 98% | Amorphous, continuous |
| Example 10 | $LiCoO_2$ | 90 | 20 | Sodium thiosulfate anhydrous | 10 | Planetary ball milling | 98% | Amorphous, continuous |
| Example 11 | $Li_3V_3(PO_4)_3$ | 95 | 5 | Sodium thiosulfate pentahydrate | 5 | Planetary ball milling | 99% | Amorphous, continuous |
| Example 12 | $Li_3V_3(PO_4)_3$ | 90 | 5 | Sodium thiosulfate pentahydrate | 10 | Planetary ball milling | 99% | Amorphous, continuous |
| Example 13 | $LiNi_{0.8}Co_{0.1}Mn_{0.1}O_2$ | 95 | 3 | Sodium thiosulfate anhydrous | 5 | Planetary ball milling | 93% | Amorphous, continuous |
| Example 14 | $LiNi_{0.8}Co_{0.1}Mn_{0.1}O_2$ | 95 | 18 | Sodium thiosulfate anhydrous | 5 | Planetary ball milling | 98% | Amorphous, continuous |
| Example 15 | $LiNi_{0.8}Co_{0.1}Mn_{0.1}O_2$ | 95 | 20 | Sodium thiosulfate anhydrous | 5 | Planetary ball milling | 98% | Amorphous, continuous |
| Example 16 | $LiNi_{0.8}Co_{0.1}Mn_{0.1}O_2$ | 95 | 12 | Sodium thiosulfate anhydrous | 5 | Planetary ball milling | 98% | Crystalline, continuous |
| Example 17 | $LiNi_{0.8}Co_{0.1}Mn_{0.1}O_2$ | 95 | 12 | Sodium thiosulfate anhydrous | 5 | Planetary ball milling | 70% | Amorphous, discrete |

TABLE 1-continued

| | Positive electrode active substance | | | Sodium thiosulfate | | | | |
|---|---|---|---|---|---|---|---|---|
| | Type | Mass proportion | Median particle size $D_v50$ (μm) | Type | Mass proportion | Ball milling process | Coating rate | State of coating layer |
| Comparative Example 1 | $LiNi_{0.8}Co_{0.1}Mn_{0.1}O_2$ | 50 | 12 | Sodium thiosulfate anhydrous | 50 | Planetary ball milling | 100% | Amorphous, continuous |
| Comparative Example 2 | $LiNi_{0.8}Co_{0.1}Mn_{0.1}O_2$ | 55 | 12 | Sodium thiosulfate anhydrous | 45 | Planetary ball milling | 100% | Amorphous, continuous |
| Comparative Example 3 | $LiNi_{0.8}Co_{0.1}Mn_{0.1}O_2$ | 100 | 12 | Sodium thiosulfate anhydrous | 0 | Planetary ball milling | / | / |
| Comparative Example 4 | $LiCoO_2$ | 100 | 20 | Sodium thiosulfate anhydrous | 0 | Planetary ball milling | / | / |
| Comparative Example 5 | $Li_3V_3(PO_4)_3$ | 100 | 5 | Sodium thiosulfate pentahydrate | 0 | Planetary ball milling | / | / |
| Comparative Example 6 | $LiNi_{0.8}Co_{0.1}Mn_{0.1}O_2$ | 95 | 12 | Sodium thiosulfate anhydrous | 5 | Doping | / | / |

Cycle Test of all-Solid-State Lithium Secondary Battery (1) Specific Discharge Capacity Test of all-Solid-State Lithium Secondary Battery At 25° C., the all-solid-state lithium secondary battery was put on a charge-discharge tester for a charge-discharge test, and then charged to 4.2 volt (V) at a constant current of 0.1C. In some examples, the all-solid-state lithium secondary battery was charged to 0.05C at a constant voltage of 4.2 V, and then discharged to 2.8 V at a constant current of 0.1C to obtain an initial specific discharge capacity M milliampere hour per gram (mAh/g) of the all-solid-state lithium secondary battery, where 1C=160 milliampere per gram (mA/g).

(2) Initial Coulombic Efficiency Test of all-Solid-State Lithium Secondary Battery At 25° C., the all-solid-state lithium secondary battery was charged to 4.2 V at a constant current of 0.1C. In some examples, the all-solid-state lithium secondary battery was charged to 0.05C at a constant voltage of 4.2 V to obtain an initial charge capacity, recorded as $Q_n$, and then discharged to 2.8 V at a constant current of 0.1C to obtain an initial discharge capacity, recorded as $Q_m$.

The initial coulombic efficiency of the all-solid-state lithium secondary battery is $\eta\ (\%)=(Q_m/Q_n)\times 100\%$.

(3) Cycling Performance Test of all-Solid-State Lithium Secondary Battery

At 25° C., the all-solid-state lithium secondary battery was charged to 4.2 V at a constant current of 0.1C. In some examples, the all-solid-state lithium secondary battery was charged to 0.05C at a constant voltage of 4.2 V, and then discharged to 3.0 V at a constant current of 0.1C. This was one charge-discharge cycle, and a discharge capacity at this time was a discharge capacity of the first cycle. Charge/discharge test was performed for the all-solid-state lithium secondary battery for 100 cycles according to the foregoing method, to obtain a discharge capacity at the $100^{th}$ cycle.

Capacity retention rate (%) of the all-solid-state lithium secondary battery after 100 cycles=(Discharge capacity at the $100^{th}$ cycle/Discharge capacity at the first cycle)×100%.

Performance test results of the all-solid-state lithium secondary batteries prepared in Examples 1 to 15 and Comparative Examples 1 to 6 are shown in Table 2.

TABLE 2

| | Performance test results of all-solid-state lithium secondary batteries | | |
|---|---|---|---|
| | First-cycle specific capacity (mAh/g) | First-cycle coulombic efficiency (%) | Capacity retention rate (%) after 100 cycles |
| Example 1 | 79 | 60 | 86 |
| Example 2 | 91 | 62 | 91.3 |
| Example 3 | 106 | 65 | 98.6 |
| Example 4 | 159 | 83 | 98.7 |
| Example 5 | 161 | 83 | 96.5 |
| Example 6 | 168 | 82 | 83.2 |
| Example 7 | 157 | 82 | 98.3 |
| Example 8 | 154 | 80 | 97.3 |
| Example 9 | 124 | 80 | 97.4 |
| Example 10 | 107 | 76 | 92.4 |
| Example 11 | 146 | 82 | 93.2 |
| Example 12 | 109 | 77 | 92.1 |
| Example 13 | 164 | 78 | 96.4 |
| Example 14 | 152 | 79 | 97.5 |
| Example 15 | 149 | 77 | 97.1 |
| Example 16 | 146 | 76 | 98.9 |
| Example 17 | 168 | 80 | 86.7 |
| Comparative Example 1 | 2 | 1 | 0 |
| Comparative Example 2 | 10 | 3 | 6 |
| Comparative Example 3 | 170 | 85 | 82.5 |
| Comparative Example 4 | 141 | 78 | 68.4 |
| Comparative Example 5 | 137 | 76 | 58 |
| Comparative Example 6 | 162 | 84 | 84.5 |

Test Result Analysis:

Examples 1 to 6 and Comparative Examples 1 to 3 show to what degree changes of a coating amount of the sodium thiosulfate affect improvement of the cycling performance and capacity retention rate of the battery. In Examples 1 to 6 and Comparative Examples 1 and 2, the sodium thiosulfate was used to coat the positive electrode active substance $LiNi_{0.8}Co_{0.1}Mn_{0.1}O_2$, and a coating process was planetary ball milling. In Comparative Example 3, the positive electrode active substance $LiNi_{0.8}Co_{0.1}Mn_{0.1}O_2$ was not coated. It can be seen that compared with no coating in Comparative Example 3, coating by the sodium thiosulfate of 1% to 30% in Examples 1 to 6 significantly improved the cycling performance and capacity retention rate of the battery. When the proportion of the sodium thiosulfate was 3% to 10%, a more significant effect of improving the cycling performance and capacity retention rate of the battery was achieved. If the proportion of the sodium thiosulfate was less than 1%, the amount of the sodium thiosulfate was not enough to well coat a surface of the positive electrode active substance, such that the cycling performance and capacity retention rate of the secondary battery were not obviously improved. If the proportion of the sodium thiosulfate was higher than 30% (for example, in Comparative Examples 1 and 2), the coating amount is too large, which caused the positive electrode active substance unable to contact electrons and lithium ions, and results in charge and discharge failure due to excessive polarization, leading to degradation of battery performance.

Examples 7 and 8 respectively show examples in which the sodium thiosulfate pentahydrate and other ball milling manners were used to coat the positive electrode active substance $LiNi_{0.8}Co_{0.1}Mn_{0.1}O_2$. It can be seen that the technical effects of the present disclosure do not impose limitations on a type of ball milling process. In some examples, whether the sodium thiosulfate anhydrous, the sodium thiosulfate pentahydrate, or the mixture thereof is selected as a raw material to coat the positive electrode active substance, the cycling performance and capacity retention rate of the battery can be improved.

Examples 9 to 12 and Comparative Examples 4 and 5 show comparative data of the battery cycling performance of different positive electrode active substances coated with the sodium thiosulfate. It can be seen that the all-solid-state lithium secondary battery prepared with $LiCoO_2$, $Li_3V_3(PO_4)_3$, and other various positive electrode active substances coated with sodium thiosulfate had a significant improvement on the capacity retention rate after 100 cycles. It indicates that with the technical solutions provided by the present disclosure, the surfaces of different positive electrode active substances are coated with sodium thiosulfate, and all the all-solid-state lithium secondary batteries prepared using the positive electrode active materials after coating had good cycling performance and capacity retention rate.

Examples 13 to 15 show how the positive electrode active substances with different median particle sizes, which are coated with sodium thiosulfate and serve as the positive electrode active materials of the battery, affect the battery cycling performance. It can be seen that, in Example 13, a volume-based median particle size of the positive electrode active substance was small, and a specific surface area of the positive electrode active substance was large, which increased occurrence frequency of side reactions, and slightly decreased the first-cycle coulombic efficiency and capacity retention rate of the battery. In Example 15, a median particle size of the positive electrode active substance was large. Because ions and electrons encountered greater resistance when entering into particles, capacity of the battery was also slightly decreased. Therefore, the positive electrode active substance with a volume-based median particle size $D_v50$ of 3 μm to 20 μm, and optionally 4 μm to 18 μm, was selected. In some examples, this helps improve the cycling performance and capacity retention rate of the battery.

Example 16 shows how a structure with the sodium thiosulfate coating the surface and a coating rate affect the battery cycling performance. It can be seen that, because a slow cooling method was used in Example 16, the sodium thiosulfate coating the surface formed a long-range ordered crystal structure, which affected deintercalation of the lithium ions, and decreased the capacity and first-cycle coulombic efficiency of the battery. However, resistance to the side reactions was not affected.

Example 16 shows how continuity of the sodium thiosulfate coating the surface affects the battery cycling performance. It can be seen that, after the continuity of surface coating decreased, because more surfaces were in contact with an electrolyte material, an initial capacity of the battery was increased. However, because the side reactions increased, the first-cycle coulombic efficiency was slightly decreased. In some examples, the cycling performance was slightly degraded.

In Comparative Example 6, the sodium thiosulfate and the positive electrode active substance were mixed and ground at the liquid nitrogen temperature. Therefore, the sodium thiosulfate and the positive electrode active substance were physically mixed without a process in which the sodium thiosulfate was liquefied by heat produced by ball milling, coated the surface of the positive electrode active substance, and then was solidified. It can be seen that, the all-solid-state lithium secondary battery in Comparative Example 6 had a capacity retention rate after 100 cycles similar to that in Comparative Example 3. This indicates that the physical mixture of the ground sodium thiosulfate and positive electrode active substance cannot effectively improve the cycling performance and capacity retention rate of the battery.

Examples 18 to 23

1. Preparation of Positive Electrode Active Material

Preparation of the positive electrode active material is the same as that in Example 4.

2. Preparation of Positive Electrode Plate

The preparation is basically the same as that in Example 4, and differences lie in the selected substance of a solid-state electrolyte in a positive electrode active substance layer of the positive electrode plate and a mass ratio of the positive electrode active material to the solid-state electrolyte.

3 Preparation of all-Solid-State Lithium Secondary Battery

The preparation is basically the same as that in Example 4, and a difference lies in the selected substance of the solid-state electrolyte for preparing a solid-state electrolyte membrane.

Related parameters of the positive electrode plates and the all-solid-state lithium secondary batteries in Examples 16 to 21 are shown in Table 3.

TABLE 3

| | Selected substance of solid-state electrolyte in positive electrode plate | Mass ratio of positive electrode active material to solid-state electrolyte in positive electrode plate | Mass ratio of element sulfur on surface of positive electrode active material to element sulfur in solid-state electrolyte in positive electrode plate |
|---|---|---|---|
| Example 18 | $Li_6PS_5Cl$ | 60:40 | 0.075:1 |
| Example 19 | $Li_6PS_5Cl$ | 70:30 | 0.116:1 |
| Example 20 | $Li_6PS_5Cl$ | 80:20 | 0.2:1 |
| Example 21 | $Li_6PS_5Cl$ | 85:15 | 0.283:1 |
| Example 22 | $Li_3PS_4$ | 70:30 | 0.097:1 |
| Example 23 | $Li_7P_3S_{11}$ | 70:30 | 0.097:1 |

A same method is used for cycling performance tests of the all-solid-state lithium secondary batteries in Examples 18 to 23, and test results are shown in Table 4.

TABLE 4

| | Performance test results of all-solid-state lithium secondary batteries | | |
|---|---|---|---|
| | First-cycle specific capacity (mAh/g) | First-cycle coulombic efficiency (%) | Capacity retention rate (%) after 100 cycles |
| Example 18 | 142 | 76 | 93.6 |
| Example 19 | 159 | 83 | 98.7 |
| Example 20 | 157 | 82 | 98.2 |
| Example 21 | 154 | 78 | 92.5 |
| Example 22 | 150 | 78 | 96.4 |
| Example 23 | 155 | 81 | 98.5 |

Examples 18 to 21 show how the ratio of the solid-state electrolyte $Li_6PS_5Cl$ to the positive electrode active material in the positive electrode plate affects the battery performance. When the mass ratio of the positive electrode active material in the positive electrode active substance layer to the solid-state electrolyte was lower than 60:40, because density of the solid-state electrolyte material was lower than that of the positive electrode active substance, this usually caused an excessively large volume fraction of the solid-state electrolyte. The positive electrode active substance was coated, making it more difficult for electrons to contact the positive electrode active substance, thereby affecting normal deintercalation of lithium ions and decreasing capacity of the battery. However, when the mass ratio of the positive electrode active material in the positive electrode active substance layer to the solid-state electrolyte was higher than 85:15, this was not enough to maintain a good ion conductivity, thereby affecting extractable capacity of the battery. For example, the first-cycle specific capacity, the first-cycle coulombic efficiency, and the cycling capacity retention rate in Examples 18 and 21 were lower than those in Examples 19 and 20. In conclusion, in the positive electrode plate of the present disclosure, when the mass ratio of the positive electrode active material in the positive electrode active substance layer to the solid-state electrolyte was 60:40 to 85:15, and optionally, was 70:30 to 80:20, ionic conductivity and electronic conductivity can be ensured, thereby ensuring high extractable capacity and cycling capacity of the battery.

Examples 22 and 23 show how different solid-state electrolytes affect the battery performance. Because $Li_6PS_5Cl$ and $Li_7P_3S_{11}$ at room temperature are both a fast-ion solid-state electrolyte with ionic conductivity larger than $10^{-3}$ siemens per centimeter (S/cm), they have small conduction resistance to lithium ions in the positive electrode active material, so that good capacity and cycling performance of the battery can be maintained. Ionic conductivity of another common solid-state electrolyte $Li_3PS_4$ is generally $10^{-4}$ S/cm, which slightly affects extractable capacity of the battery. Therefore, the type and amount of the solid-state electrolyte used in the battery also affect the extractable capacity of the battery.

According to the disclosure and teaching of this specification, those skilled in the art may further make changes or modifications to the foregoing embodiments. Therefore, the present disclosure is not limited to the foregoing disclosure and the described embodiments, and some changes or modifications to the present disclosure shall also fall within the protection scope of the claims of the present disclosure. In addition, although some specific terms are used in this specification, these terms are used only for ease of description, and do not constitute any limitation on the present disclosure.

What is claimed is:

1. A positive electrode plate for an all-solid-state lithium secondary battery, wherein the positive electrode plate comprises:

a positive electrode current collector; and a positive electrode active substance layer disposed on at least one surface of the positive electrode current collector, wherein the positive electrode active substance layer comprises a sulfide solid-state electrolyte and a positive electrode active material, wherein the positive electrode active material comprises a positive electrode active substance and a sodium thiosulfate coating layer coating a surface of the positive electrode active substance, wherein the sodium thiosulfate coating layer is a continuous amorphous membrane layer on the surface of the positive electrode active substance, wherein a mass ratio of element sulfur on a surface of the positive electrode active material to element sulfur in the solid-state electrolyte ranges from 0.06:1 to 0.28:1, and wherein a volume-based median particle size Dv50 of the positive electrode active substance is 3 μm to 20 μm.

2. The positive electrode plate according to claim 1, wherein a coating rate of the sodium thiosulfate coating layer on the surface of the positive electrode active substance is at least 95%.

3. The positive electrode plate according to claim 1, wherein a mass percentage of the sodium thiosulfate coating layer in the positive electrode active material is 3% to 10%.

4. The positive electrode plate according to claim 1, wherein the positive electrode active substance is selected from at least one of lithium metal oxides with an olivine structure, lithium metal oxides with a layered structure, lithium metal oxides with a spinel structure, or modified materials of the foregoing materials.

5. The positive electrode plate according to claim 1, wherein the positive electrode active substance is selected from at least one of $Li_{1+x3}Ni_{1-y3-z3}Co_{y3}M''_{z3}O_2$, wherein $-0.1 \leq x3 \leq 0.2$, $0 \leq y3 \leq 1$, $0 \leq z3 \leq 1$, and $0.05 \leq y3+z3 \leq 0.4$, and M" is selected from at least one of Mn, Al, Mg, and Ti.

6. The positive electrode plate according to claim 1, wherein the solid-state electrolyte is a sulfide solid-state electrolyte.

7. An all-solid-state lithium secondary battery, comprising: a positive electrode plate, a negative electrode plate, and a solid-state electrolyte membrane disposed between the positive electrode plate and the negative electrode plate, wherein the positive electrode plate comprises:

a positive electrode current collector; and a positive electrode active substance layer disposed on at least one surface of the positive electrode current collector, wherein the positive electrode active substance layer comprises a sulfide solid-state electrolyte and a positive electrode active material, wherein the positive electrode active material comprises a positive electrode active substance and a sodium thiosulfate coating layer coating a surface of the positive electrode active substance, wherein the sodium thiosulfate coating layer is a continuous amorphous membrane layer on the surface of the positive electrode active substance, wherein a mass ratio of element sulfur on a surface of the positive electrode active material to element sulfur in the solid-state electrolyte ranges from 0.06:1 to 0.28:1, and wherein a volume-based median particle size Dv50 of the positive electrode active substance is 3 μm to 20 μm.

8. An apparatus, comprising the all-solid-state lithium secondary battery according to claim 7, wherein the all-solid-state lithium secondary battery is used as a power source of the apparatus or an energy storage unit of the apparatus.

9. The positive electrode plate according to claim 1, wherein a mass percentage of the sodium thiosulfate coating layer in the positive electrode active material is 3% to 30%.

10. The positive electrode plate according to claim 9, wherein the mass percentage of the sodium thiosulfate coating layer in the positive electrode active material is 5% to 30%.

11. The positive electrode plate according to claim 1, wherein the volume-based median particle size Dv50 is 4 μm to 18 μm.

12. The positive electrode plate according to claim 1, wherein a mass ratio of the positive electrode active material to the solid-state electrolyte ranges from 60:40 to 85:15.

13. The positive electrode plate according to claim 12, wherein the mass ratio of the positive electrode active material to the solid-state electrolyte ranges from 70:30 to 80:20.

14. The positive electrode plate according to claim 1, wherein the sulfide solid-state electrolyte comprises one or more of $Li_6PS_5Cl$, $Li_3PS_4$, and $Li_7P_3S_{11}$.

15. The positive electrode plate according to claim 1, wherein the positive electrode current collector comprises aluminum foil or nickel foil.

16. The positive electrode plate according to claim 1, wherein the positive electrode active substance layer further comprises a conductive agent and a binder.

17. The all-solid-state lithium secondary battery according to claim 7, wherein a mass percentage of the sodium thiosulfate coating layer in the positive electrode active material is 3% to 30%.

18. The all-solid-state lithium secondary battery according to claim 17, wherein the mass percentage of the sodium thiosulfate coating layer in the positive electrode active material is 5% to 30%.

19. The all-solid-state lithium secondary battery according to claim 7, wherein a mass ratio of the positive electrode active material to the solid-state electrolyte ranges from 60:40 to 85:15.

20. The all-solid-state lithium secondary battery according to claim 7, wherein the sulfide solid-state electrolyte comprises one or more of $Li_6PS_5Cl$, $Li_3PS_4$, and $Li_7P_3S_{11}$.

* * * * *